3,282,866
COMPOSITIONS FOR COATING PAPER
Heinz Pohlemann, Limburgerhof, Pfalz, Karl Hasse, Frankenthal, Pfalz, and Immo Reinbold and Diethelm Bruening, Ludwigshafen (Rhine), Germany, assignors to Badische Anilin- & Soda-Fabrik Aktiengesellschaft, Ludwigshafen (Rhine), Germany
No Drawing. Filed Oct. 22, 1963, Ser. No. 318,107
Claims priority, application Germany, Oct. 25, 1962, B 69,380
14 Claims. (Cl. 260—8)

This invention relates to compositions for coating paper.

Aqueous compositions for coating paper which have as their main components pigments and organic binders, such as casein, starch and plastics dispersions or mixtures of these substances, have already been used for the production of art paper.

Application of these coating compositions to the paper is usually carried out with conventional equipment, such as brush coating plant, air knife coating plant, roll coaters or doctor blades. Application of paper-coating compositions by means of roll coaters is often used because this method can be smoothly integrated into the paper machine in the paper manufacturing process. The coating compositions should satisfy various physical requirements, for example they should flow well even when they have a high solids content and should be resistant to mechanical stress, for example shear stress.

Paper-coating compositions which are to be used for roll coating methods particularly need to satisfy the said requirements because otherwise the shear stress occuring between the applicator rolls will lead to the formation of coagulate and coatings on the rollers so that continuous and uniform application of the composition to the paper becomes impossible. The ability of the coating to bind pigments is of particular importance for the printing quality of the coated paper. The plastics dispersions contained in the paper-coating compositions are of decisive importance for the said properties.

Dispersions of copolymers of acrylic esters and/or vinyl esters have therefore already been used as binders for coating compositions for paper. These dispersions are however not compatible with large amounts of pigment, casein or starch, or elese they form highly viscous coating compositions which are difficult to use or they form coating compositions which although initially of low viscosity gradually thicken. Such paper-coating compositions are therefore of only limited application for the production of art papers.

Further coating compositions are known comprising copolymers which contain small amounts of a polymerizable acid amide in polymerized form. It has been found that these coating compositons gradually thicken and that they also have a poor flow and are not resistant to shear stress.

We have now found that paper-coating compositions which contain an aqueous polymer dispersion, one or more pigments, starch or casein and if desired other additives, have particularly advantageous properties if the dispersion contains a copolymer of 40 to 70 parts by weight of styrene, 40 to 70 parts by weight of at least one ester of acrylic acid with an alcohol having two to twelve carbon atoms and 0.5 to 5 parts by weight of methacrylamide and also an emulsifier mixture comprising: (a) at least one alkylated phenol having a branched or linear carbon chain of six to twenty carbon atoms which has been reacted, per mole, with at least nine moles of ethylene oxide or propylene oxide and then sulfonated and (b) at least one reaction product having emulsifying action and obtained from at least ten moles of ethylene oxide per mole of a compound containing hydroxyl, carboxyl or amide groups.

Compared with prior art paper-coating compositions, coating compositions which contain dispersions to be used according to this invention, even when they have a solids content of more than 60%, have low viscosity. The viscosity changes only to a trivial extent after storage periods of twenty-four hours. Furthermore the coating compositions are resistant to frost, heat, storage and electrolytes. In particular they are stable to shear stress. They are therefore particularly suitable for processing with the conventional applicator equipment, especially roll coaters and doctor blades. The ability of the coating of the paper coated with the coating compositions to bind pigments is greater than that with coatings prepared with other coating compositions.

Among the acrylic esters which may be used together with styrene and methacrylamide for the production of the copolymer dispersions, it is preferred to use acrylic esters of n-butyl, isobutyl, hexyl, n-octyl, isooctyl and dodecyl alcohol.

The dispersions to be used according to this invention are prepared by conventional methods of emulsion polymerization. Initiators used for the polymerization may be compounds which decompose into free radicals under the polymerization conditions, such as potassium persulfate, sodium persulfate, ammonium persulfate, peroxyacetic acid, and also water-soluble azo compound, such as azodiisobutyro-amide or potassium azodiisobutyrate, in amounts of 0.1 to 1% with reference to the monomers.

The initiators may also be used as mixtures or together with water-insoluble initiators, such as benzoyl peroxide or azodiisobutyronitrile. Activating agents, for example reducing agents, such as salts or derivatives of sulfurous acid, or also alkylamide or oxyalkylamides may be used in small amounts. The production of the polymers is not the subject of the present invention.

Examples of alkylated phenols (a) having branched or linear carbon chains of six to twenty carbon atoms, which are reacted with ethylene oxide or propylene oxide and then sulfonated, are the reaction products of isooctylphenol, hexylphenol, n-octylphenol, decylphenol, tridecylphenol and octadecylphenol which have been reacted with at least 9 moles and at the most 50 moles of ethylene oxide or propylene oxide or the same amount of the two oxides.

Examples of reaction products (b) having emulsifying action and prepared from at least 10 moles and at the most 50 moles of ethylene oxide with 1 mole of a compound containing a hydroxyl, carboxyl or amide group are those of saturated or unsaturated fatty acids or their amides having at least 10 carbon atoms or of alcohols having at least 10 carbon atoms or also of alkylated aromatic hydroxy compounds having branched or linear carbon chains. Especially suitable are reaction products of long-chain aliphatic alcohols which may be branched and may contain double bonds and which have from 12 to 20 carbon atoms, and p-alkylated phenols with branched or linear alkyl chains having from 6 to 20 carbon atoms. Such compounds include laury alcohol, sperm oil alochol, octadecyl alcohol, p-hexylphenol, p-octylphenol, p-isooctylphenol, p-decylphenol and p-octadecylphenol.

The emulsifier mixtures are contained in the dispersions in amounts of 0.5 to 10% by weight, preferably in amounts of 2 to 7% by weight, with reference to the copolymer.

Dispersions are most suitable which have been obtained with emulsifier mixtures which contain 5 to 50% by weight of the component (b) with reference to the total amount of the emulsifier mixture (a) and (b).

The coating compositions preferably have a solids content of 25 to 66% by weight. The proportion of polymer is between 2 and 30% by weight, the pigment content 50 to 95% by weight of the whole of the solids present in the coating composition. The paper-coating compositions may also contain up to 40% by weight of solubilized starch or casein or mixtures of the two substances, again with reference to the solids content.

Examples of conventional pigments which may be contained in the coating compositions are kaolin, china clay, barium sulfate, calcium carbonate and titanium dioxide. Moreover other additives, such as dispersing agents for pigments, optical brighteners, dyes, antifroth agents, waxes or plasticizers, may also be contained in the paper-coating compositions.

Examples of dispersing agents are salts of polyacrylic acid, salts of maleic acid copolymers, for example with styrene, vinyl ethers and isobutylene, salts of partly esterified maleic acid copolymers and high molecular weight polyphosphates.

The invention is further illustrated by the following examples in which parts specified are parts by weight.

*Example 1*

(a) A solution of 0.3 part of sodium hexametaphosphate in 50 parts of water is adjusted to pH 8 with caustic soda solution. Then 100 parts of china clay is stirred into the solution by means of an impeller, and then 15 parts of a 25% starch solution (solubilized at 80° to 90° C.) at room temperature. 30 parts of a dispersion (I) of a copolymer of 40 parts of styrene, 60 parts of isobutyl acrylate and 2.5 parts of methacrylamide in 110 parts of water, which contains as emulsifier a mixture of 4 parts of p-isooctylphenol oxyethylated with 25 moles of ethylene oxide and then converted into the sodium salt of its sulfuric acid half-ester, and 2 parts of p-isooctylphenol reacted with 25 moles of ethylene oxide, is added to the said mixture while stirring and the whole is diluted with water to a solids content of 45% by weight.

A coating composition is prepared in the same way from a dispersion (II) which contains a copolymer of 40 parts of styrene, 60 parts of isobutyl acrylate and 2.5 parts of acrylic acid and the same emulsifier mixture as in dispersion (I).

The viscosities of the two coating compositions are measured after two hours and after twenty-four hours. The measured viscosity data constitute a measure of the processability of the dispersions.

The following values are obtained:

| Coating composition from— | Outflow viscosity measured in Ford beaker No. 4 after— | |
|---|---|---|
| | 2 hours | 24 hours |
| Dispersion I | 18 seconds | 19 seconds |
| Dispersion II | 23 seconds | 32 seconds |

(b) Coating compositions are prepared having solids contents of 60% and having the following composition: 100 parts of china clay, 3 parts of casein, 24 parts of 50% polymer dispersion (I) or (II).

Prior to mixing, the casein is solubilized with 4.5% caustic soda (solid), with reference to casein, in 25% aqueous suspension for half an hour at 40° to 50° C. The coating compositions are adjusted to pH 10 to 11 with caustic soda solution. The following viscosities are then determined for the compositions with a Brookfield viscometer:

| Coating composition containing dispersion— | Viscosity after— | |
|---|---|---|
| | 2 hours | 24 hours |
| I | 303 cp | 250 cp |
| II | 617 cp | 1,649 cp |

Method of preparation of dispersions I and II:

A mixture of 40 parts of styrene, 60 parts of isobutyl acrylate and 2.5 parts of methacrylamide is emulsified in a solution of 110 parts of water and 0.5 parts of potassium persulfate. 20 parts of this emulsion is heated to 85° C. in a vessel provided with a stirrer. After the polymerization has started, the remainder of the monomer emulsion is allowed to flow in at 85° to 87° during the course of three hours. Nitrogen is blown through for half an hour, the dispersion is cooled to room temperature and the resultant dispersion I is adjusted to pH 8 to 9 with ammonia. Dispersion II is prepared in the same way using acrylic acid instead of methacrylamide.

*Example 2*

In the manner described in Example 1(a), a coating composition containing 45% of starch is prepared using a dispersion (III) of a copolymer of 50 parts of styrene, 50 parts of n-butyl acrylate, 1.5 parts of methacrylamide in 110 parts of water which contains as emulsifier 3.5 parts of p-isooctylphenol oxyethylated with 25 moles of ethylene oxide which has then been converted into the sodium salt of its sulfuric acid half ester and 2 parts of isooctylphenol reacted with 25 moles of ethylene oxide.

A coating composition is prepared in the same way from a dispersion (IV) which contains a copolymer of 50 parts of styrene, 50 parts of butyl acrylate, and 1.5 parts of methacrylamide in 110 parts of water and as emulsifier 2 parts of a sodium alkylsulfonate having twelve to eighteen carbon atoms and 1.5 parts of p-isooctylphenol reacted with 25 moles of ethylene oxide.

Paper webs are coated with these coating compositions on a roll coater. During application of the coating composition which contains dispersion (IV), coagulate forms on the rollers after one minute so that the coating process has to be stopped. In contrast, no coagulate forms during application of the coating composition containing dispersion (III) even after prolonged running.

Coating compositions having solids contents of 65% by weight are prepared from 100 parts of china clay, 0.3 part of sodium hexametaphosphate, 11 parts of solubilized starch and 6 parts of dispersion (III) or (IV). The following viscosity data are determined for the compositions with a Brookfield viscometer:

| Coating composition containing dispersion— | Viscosity in centipoises after— | |
|---|---|---|
| | 2 hours | 24 hours |
| III | 5,060 | 5,670 |
| IV | 10,860 | 15,920 |

*Example 3*

An about 50% dispersion (V), which contains a copolymer of 40 parts of styrene, 60 parts of isobutyl acrylate, and 2.5 parts of methacrylamide in 110 parts of water and 4 parts of a p-isooctylphenol oxyethylated with 25 moles of ethylene oxide as an emulsifier, and which has then been converted into the sodium salt of its sulfuric acid half ester, and which also contains 2 parts of a nonylphenol reacted with 30 moles of ethylene oxide is used as described in Example 1(b) for the production of a 60% coating composition containing casein and as described in Example 2 for the production of a 64% coating composition containing starch.

In the same way coating compositions are prepared from a dispersion (VI) which contains a copolymer of 65 parts of vinyl propionate and 35 parts of isobutyl acrylate and 1.5 parts of methacrylamide in 110 parts of water and the same emulsifier system as dispersion V, and also from a dispersion (VII) which contains a copolymer from 60 parts of styrene, 40 parts of butadiene and 2 parts of methacrylamide in 110 parts of water and the same emulsifier system as dispersion V. Coating paper is coated with these coating compositions, the rate of application being 8 g./sq. m. in each case. The coated papers are kept for twenty-four hours at 20% and 65% relative humidity. The pigment binding power of the coated papers is measured with an IGT-test printing appliance. The data obtained form a relative measure of the pigment binding power. Operation of the IGT-test printing appliance is described in Tappi, volume 40 (1957), part 10, page 794 et seq.

|  | Picking values in cm./sec. from dispersion— | | |
|---|---|---|---|
|  | (V) | (VI) | (VII) |
| 60% casein coating composition | 205 | 103 | 143 |
| 64% starch coating composition | 90 | 49 | 84 |

*Example 4*

Paper-coating compositions containing starch are prepared as described in Example 1(a). The dispersions used have been prepared from the monomers and emulsifier mixture given in the following table. The viscosities of the compositions are measured two hours after preparation and after storage for twenty-four hours.

| Dispersion | Emulsifier | Viscosity after 24 hours |
|---|---|---|
| VIII 65 parts of styrene, 35 parts of 2-ethylhexyl acrylate, 2.5 parts of methacrylamide. | (a) 2.5 parts of the sodium salt of the sulfuric acid half ester of p-dodecylphenol reacted with 30 moles of ethylene oxide. (b) 2.5 parts of sperm oil alcohol, reacted with 25 moles of ethylene oxide. | No change occurs. |
| IX 70 parts of styrene, 30 parts of dodecyl acrylate, 3 parts of methacrylamide. | (a) 3 parts of the sodium salt of the sulfuric acid half ester of p-nonylphenol reacted with ethylene oxide. (b) 2.5 parts of tridecanol reacted with 40 moles of ethylene oxide. | No change occurs. |
| X 40 parts of styrene, 60 parts of ethyl acrylate, 0.5 part of methacrylamide. | (a) 3 parts of the sodium salt of the sulfuric acid half ester of p-nonylphenol reacted with 25 moles of ethylene oxide. (b) 2.5 parts of mixture of aliphatic straight-chain alcohols with 16 to 18 carbon atoms reacted with 40 moles of ethylene oxide. | No change occurs. |
| XI 50 parts of styrene, 25 parts of isobutyl acrylate, 25 parts of 2-ethylhexyl acrylate, 1.5 parts of methacrylamide. | (a) 4 parts of the sodium salt of the sulfuric acid half ester of p-tridecylphenol reacted with 10 moles of propylene oxide. (b) 2.5 parts of p-isooctylphenol reacted with 25 moles of ethylene oxide. | No change occurs. |
| XII 60 parts of styrene, 40 parts of ethyl acrylate, 2 parts of methylacrylamide. | (a) 4 parts of the sodium salt of the sulfuric acid half ester of p-octadecylphenol reacted with 30 moles of ethylene oxide. (b) 2.5 parts of octadecylphenol reacted with 20 moles of ethylene oxide. | No change occurs. |
| XIII 70 parts of styrene, 30 parts of dodecyl acrylate, 3 parts of methacrylic acid. | (a) 4 parts of the sodium salt of the sulfuric acid half ester of p-tridecylphenol reacted with 10 moles of propylene oxide. (b) 2.5 parts of p-isooctylphenol reacted with 25 moles of ethylene oxide. | Becomes highly viscous. |
| XIV 50 parts of styrene, 25 parts of isobutyl acrylate, 25 parts of 2-ethylhexylacrylate, 1.5 parts of methacrylamide. | (a) 4 parts of the sodium salt of the sulfuric acid half ester of p-tridecylphenol reacted with 10 moles of propylene oxide. (b) 0.5 part of p-isooctylphenol reacted with 40 moles of ethylene oxide. | No change occurs. |
| XV 50 parts of styrene, 25 parts of isobutyl acrylate, 25 parts of 2-ethylhexyl acrylate, 1.5 parts of methacrylamide. | 4 parts of arylalkyl sulfonate. | Unstable. |

We claim:

1. A coating composition for paper, comprising an aqueous polymer dispersion, a pigment and a member selected from the group consisting of starch and casein, wherein the dispersion contains:
   (i) a polymer of 40 to 70 parts by weight of styrene, 40 to 70 parts by weight of an acrylic ester of an aliphatic alcohol having two to twelve carbon atoms and 0.5 to 5 parts by weight of methacrylamide and
   (ii) an emulsifier mixture comprising
   (a) an alkylated phenol having a carbon chain with six to twenty carbon atoms, which has been reacted per mole with at least nine moles and at the most 50 moles of a member selected from the group consisting of ethylene oxide, propylene oxide and mixtures thereof and then sulfonated, and
   (b) a reaction product of at least ten moles and at the most 50 moles of ethylene oxide per mole of a compound selected from the group consisting of an alkylated phenol having a carbon chain with six to twenty carbon atoms and aliphatic alcohols with 12 to 20 carbon atoms.

2. A coating composition as claimed in claim 1 which contains 2 to 7% by weight of said emulsifier mixture (ii) with reference to said copolymer (i).

3. A coating composition as claimed in claim 1 wherein said emulsifier mixture (ii) contains 5 to 50% by weight of component (b) with reference to the total amount of said emulsifier mixture (ii).

4. A coating composition as claimed in claim 1 wherein the content of dispersed solids is about 25 to 66% by weight.

5. A coating composition as claimed in claim 4 wherein the content of dispersed solids is more than 60% by weight.

6. A coating composition for paper comprising:
   (A) an aqueous polymer dispersion consisting essentially of
   (i) a copolymer of 40 to 70 parts by weight of styrene, 40 to 70 parts by weight of an acrylic ester of an aliphatic alcohol having two to twelve carbon atoms and 0.5 to 5 parts by weight of methacrylamide, and
   (ii) 2 to 7% by weight, with reference to said copolymer (i) of an emulsifier mixture consisting essentially of (a) an alkylated phenol having a carbon chain with six to twenty carbon atoms, which has been reacted per mole with at least nine moles and at the most 50 moles of a member selected from the group consisting of ethylene oxide, propylene oxide and mixtures thereof and then sulfonated, and (b) a reaction product of at least ten moles and at the most 50 moles of ethylene oxide per mole of a compound selected from the group consisting of an alkylated phenol having a carbon chain with six to twenty carbon atoms and aliphatic alcohols with 12 to 20 carbon atoms, said emulsifier mixture containing 5 to 50% by weight of component (b) with reference to the total weight of components (a) and (b);

(B) a pigment; and (C) a solubilized material selected from the group consisting of starch and casein, the total solids content of the coating composition as represented by the copolymer (i), the pigment (B) and the solubilized material (C) being about 25 to 66% by weight with reference to the total weight of the composition.

7. A coating composition as claimed in claim 6 wherein the copolymer (i) is present in an amount of about 2 to 30% by weight, the pigment (B) is present in an amount of about 50 to 95% by weight and the solubilized material (C) is present in an amount of up to about 40% by weight, all percentages by weight being with reference to the total solids content of the composition.

8. A coating composition as claimed in claim 6 wherein the acrylic ester in the copolymer (i) is a butyl acrylate.

9. A coating composition as claimed in claim 6 wherein the acrylic ester in the copolymer (i) is ethyl acrylate.

10. A coating composition as claimed in claim 6 wherein the acrylic ester in the copolymer (i) is 2-ethylhexyl acrylate.

11. A coating composition as claimed in claim 6 wherein the alkylated phenol of component (a) is an octylphenol.

12. A coating composition as claimed in claim 6 wherein the alkylated phenol of component (a) is decylphenol.

13. A coating composition as claimed in claim 6 wherein the alkylated phenol of component (a) is tridecylphenol.

14. A coating composition as claimed in claim 6 wherein the alkylated phenol of component (a) is octadecylphenol.

References Cited by the Examiner

UNITED STATES PATENTS

| 2,536,018 | 1/1951 | Schoenholz et al. | 260—29.6 |
| 2,769,713 | 11/1956 | Wilson | 260—29.6 |
| 2,790,735 | 4/1957 | McLaughlin et al. | 260—29.6 |

FOREIGN PATENTS 162,089  3/1955  Australia.

OTHER REFERENCES

The Condensed Chemical Dictionary, 5th ed., Reinhold Publishing Corp., 1956, p. 405.

WILLIAM H. SHORT, *Primary Examiner.*

E. M. WOODBERRY, *Assistant Examiner.*